United States Patent Office 3,660,311
Patented May 2, 1972

3,660,311
NOVEL FRAGRANCE METHODS AND
COMPOSITIONS
Christian F. Wight, Mount Kisco, N.Y., assignor to International Flavors & Fragrances Inc., New York, N.Y.
No Drawing. Filed Jan. 9, 1970, Ser. No. 1,873
Int. Cl. A61k 7/00; C11b 9/00
U.S. Cl. 252—522       4 Claims

ABSTRACT OF THE DISCLOSURE

Processes for imparting fragrances to articles which comprise incorporating with such articles an effective amount of a polyalkylindanylpropanol, together with compositions for carrying out such processes and the products so obtained.

BACKGROUND OF THE INVENTION

The present invention relates to novel processes for imparting fragrances to articles, to novel olfactory compositions, and to articles produced by the processes.

Not only are natural sources of perfume and fragrance materials increasingly taxed by increasing demand for perfumed articles, but there is also a continuing search for materials providing different nuances or novel combinations of olfactory properties not heretofore available. Such products should be stable, compatible with other perfume ingredients, and capable of a wide range of usage in scented products such as soap, shampoo, cosmetic preparations, and the like.

THE INVENTION

Briefly, the present invention contemplates processes for enhancing the olfactory properties of articles by incorporating with such articles at least one polyalkylindanylpropanol. Also contemplated are perfume and fragrance compositions containing such indane derivatives and the articles to which such fragrances are imparted.

The polyalkylindanylpropanols contemplated herein are those wherein four or more alkyl groups are substituent on the five-membered ring, and the six-membered ring is attached to the β-carbon atom of the propanol. Thus, the substituted indanylpropanols according to the present invention are represented by the formula

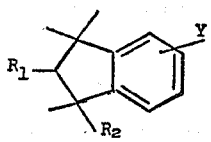

wherein $R_1$ is hydrogen or methyl; $R_2$ is methyl, or when $R_1$ is hydrogen, methyl or ethyl; and Y is 1-hydroxyprop-2-yl, that is,

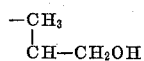

More specifically, the present invention utilizes 2-(1',1',2',3',3'-pentamethylindan-5'-yl)propanol having the formula

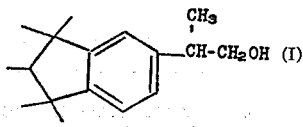

2-(1',1',3',3'-tetramethylindan-5'-yl)propanol having the formula

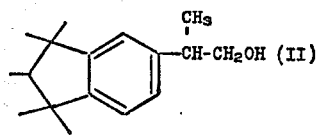

2 - (1',1',2',3',3'-pentamethylindan-4'-yl)propanol having the formula

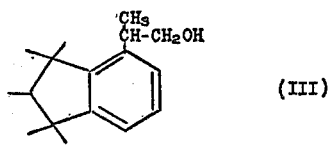

2 - (1'-ethyl-1',3',3'-trimethylindan-5'-yl)propanol having the formula

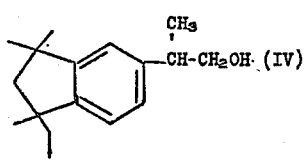

and 2 - (1' - ethyl-1',3',3'-trimethylindan-4'-yl)propanol having the formula

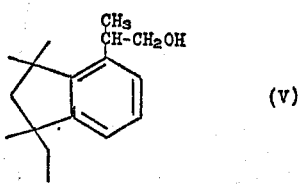

The first-mentioned material in this paragraph is disclosed in U.S. Pat. 3,360,530 as an intermediate in the preparation of isochroman fragrance materials.

The foregoing polyalkylindanylpropanols can be prepared by a number of reaction routes. One desirable route, as shown in the above-mentioned patent, involves the treatment of pentamethylindane with propylene oxide in the presence of a Friedel-Crafts catalyst, desirably an aluminum trihalide such as aluminum chloride. It is desirable to carry out the reaction at temperatures below 10° C. to prevent polymerization of the oxide and the formation of unwanted by-products. At extremely low temperatures the reaction velocity becomes low, so it is desirable to carry out the reaction at temperature not substantially below —20° C. Accordingly the reaction is desirably carried out at from —20° C. to 0° C. It is preferred to carry out the reaction at from —15° to —5° C.

The products so obtained are colorless to lightly colored solids having melting points of 50–60° C. and a very lasting, woody, amber odor character. The individual materials represented by the formulae herein can be separated as, and if, desired by conventional methods such as chromatography, distillation, crystallization and like techniques. Material I generally has a stronger, more persistent aroma than IV or V and is followed in the respect by III and II. The mixtures produced by the foregoing process generally contain from more than 50 percent up to 80 or 85 percent of I.

The indanylpropanols of this invention are useful individually or in admixtures as fragrances. They can be used to contribute a very lasting, woody amber fragrance. As olfactory agents the indane derivatives of this invention can be formulated into or used as components of a "perfume composition."

The term "perfume composition" is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by high-lighting or modernating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 2% of the compounds of this invention, or even less, can be used to impart a woody amber odor to soaps, cosmetics, and the other products. The amount employed can range up to 50% or higher and will depend on considerations of cost, nature of the end product, the effect desired on the finished product and the particular fragrance sought. All parts, percentages, proportions, and ratios herein are by weight unless otherwise indicated.

The indanylpropanols of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little or 0.01% of one or more of the indanylpropanols will suffice to impart a long-lasting woody amber odor. Generally, no more than 0.3% is required.

In addition, the perfume composition or fragrance composition can contain a vehicle or carrier for the indanylpropanols alone or with other ingredients. The vehicle can be a liquid such as alcohol, glycol, or the like. The carrier can be an absorbent solid such as a gum or components for encapsulating the composition.

It will be appreciated that the indane derivatives according to this invention can be used to alter, enhance, modify, vary, or supplement the fragrance properties of natural or synthetic fragrance compositions. Thus, such preferred indanylpropanols can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance composition.

The following examples are given to illustrate embodiments of the invention as it is presently preferred to practime it. It will be understood that these examples are illustrative, and the invention is not to be considered as restricted thereto except as indicated in the appended claims.

EXAMPLE I

Preparation of 2-indanylpropanol

To a well stirred mixture of 1504 g. (8 moles) of 1,1,2-3,3-pentamethylindane and 1066 g. (8 moles) of anhydrous aluminum chloride powder maintained at −10° to −5° C., there is added over a nine-hour period, a solution of 465 g. (8 moles) of propylene oxide in 13,335 g. (72 moles) of 1,1,2,3,3-pentamethylindane. The propylene oxide-hydrocarbon solution is added below the surface of the aluminum chloride-hydrocarbon slurry. When the addition is complete, the reaction mass is immediately added to an equal volume of well-stirred ice water.

The organic upper layer is separated, washed with one-third its volume of 5.0 N aqueous sodium hydroxide solution and then three times with equal volumes of saturated sodium chloride solution. The unreacted pentamethylindane, 13,290 g., is removed by vacuum distillation until a distillation pot temperature of 98° C./3 mm. of Hg is obtained.

The crude topped alcohol is then placed in the pot of an alembic still under a moderate vacuum with the reflux regulator set at 100% takeoff, so that no material is refluxed. The remainder of the unreacted indane hydrocarbon is removed by heating to a pot temperature of 160° C. at 50 mm. Hg. The vacuum is then increased to 3.0 mm. Hg and the temperature to 250° C., and the product is distilled over without reflux. More than 95% of the crude charge to the still is recovered as indanylpropanol.

The product obtained upon cooling is a solid melting at 43–54° C. This product comprises about 57% I, the remainder being largely II and III with small quantities of IV and V. This product has a rich, long-lasting woody amber scent which suits it for incorporation into a wide variety of perfumes, fragrance compositions, and articles such as soaps, detergents, body and face powders and talcs, and the like as herein described. It can be used to lend persistence to perfume compositions, as well as to modify, improve, enhance or vary the aromas. For severe use conditions, such as in detergents used for laundering at high water temperatures, it is particularly valuable in imparting an amber sweetness and in providing such rich undertone on the laundered goods after they are washed and dried. Thus, the products of this invention have a substantive effect under severe conditions, which effect is particularly valuable.

Infrared (IR) spectroscopy of the alcohol produced in this example shows an absorption at 2.98 microns attributable to a hydroxyl group, at 6.20 and 6.35 attributable to the carbon-carbon bonds of an aromatic ring, at 7.26 and 7.35 attributable to gem-dimethyls, at 7.30 attributable to isolated methyls, at 9.65 attributable to a hydroxyl, at 11.32 attributable to aromatic hydrogen, and at 12.17 attributable to adjacent aromatic hydrogens. Proton magnetic resonance (PMR) analysis of a distilled recrystallized same in carbon tetrachloride on a Varian A-60 instrument shows the following chemical shifts ($\delta$).

| $\delta$(p.p.m.): | Assignment | Ratio |
|---|---|---|
| 7.00 | Aryl protons | 3 |
| 3.55 (doublet) | —$CH_2$—O— | 1.8 |
| 2.80 (sextet) | Aryl—CH— | 1.2 |
| 1.92–1.3 | Methine protons | |
| 1.28, 1.08 (singlet) | Gem-dimethyl protons | |
| 1.26 (doublet) | Aryl—C—$CH_3$ | 20.4 |
| 0.98 (doublet) | Aryl—C—C—$CH_3$ | |

The individual alcohol components are isolated by conventional chromatographic techniques.

EXAMPLE II

The following composition is prepared:

| Ingredient: | Amount (grams) |
|---|---|
| Cassia absolute | 60 |
| Methyl ionone | 60 |
| Jasmin extra | 80 |
| Neroli oil, bigarade | 60 |
| Patchouli oil | 60 |
| Vanillin | 60 |
| Voilet perfume base | 60 |
| Indanylpropanol produced in Example I | 60 |
| Lemon oil | 80 |
| Rose geranium oil | 120 |
| Lavender oil, French | 120 |
| Sweet orange oil | 80 |
| Musk extract, 3% | 50 |
| Civet extract, 3% | 50 |
| | 1000 |

The above composition was originally designed with 60 parts of Vetiver oil and when this was replaced by the indanylpropanol it was found to have the same desirable characteristics of richness and persistence provided by the expensive natural oil, plus a novel woody; amber-like quality. The 2-indanylpropanol thus can substitute for or replace traditional materials such as sandalwood, vetivert, and patchouli.

EXAMPLE III

Lilac perfume composition

A perfume composition is prepared by admixture of the following ingredients in the quantities indicated:

| Ingredient: | Amount (g.) |
|---|---|
| Heliotropin | 30 |
| American Liq. Styrax | 5 |
| Terpineol | 65 |
| Indole 10% | 8 |
| Phenylethyl alcohol | 100 |
| Phenylacetaldehyde 50% | 2 |
| Aubepine | 4 |
| Anisic acetate | 5 |
| Cinnamic alcohol | 14 |
| Hydroxycitronellal | 100 |
| Ylang oil | 15 |
| Isoeugenol | 2 |

The foregoing composition is evaluated as produced and then 50 g. of the indanylpropanol produced in Example I is added. The addition introduces a rich, sweet amber undertone to the lilac without interfering with its essential floral quality. The indanylpropanol lends persistence to the composition and improves it as a finished fragrance.

EXAMPLE IV

A portion of the lilac composition of Example III without the polyalkylindanylpropanol and a portion of the lilac composition with the indanylpropanol in the proportion indicated in Example III are each incorporated into a lauryl sulfate-based detergent composition at the 0.2% level. Each detergent is then used to wash fabrics in a controlled test.

The aroma of the detergent with indanylpropanol is both richer and sweeter, and the washed and dried fabrics exhibit a residual ambery sweetness not present in the fabrics washed with the detergent not containing indanylpropanol in the lilac perfume. This substantive effect is judged to be an especially valuable feature in perfumes used for imparting fragrance to detergents.

EXAMPLE V

An amber base perfume is prepared utilizing the indicated quantities of ingredients:

| Ingredient: | Amount (g.) |
|---|---|
| Distilled labdanum oil | 2 |
| Transdecahydro β-naphthol | 20 |
| Tetrahydro para-methylquinoline | 1 |
| Benzyl alcohol | 15 |
| Skatole 1% | 5 |
| Cedryl methyl ether | 7 |
| Indanylpropanol of Example I | 50 |

The foregoing composition provides a tenacious and beautiful background of amber odor suitable for a wide variety of uses.

EXAMPLE VI

An Amber Royale perfume composition is prepared by admixing ingredients as follows:

| Ingredient: | Amount (g.) |
|---|---|
| Diphenylmethane | 5 |
| Vetivert oil, English | 5 |
| Clary sage oil | 5 |
| Jasmin absolute | 10 |
| Violet, synthetic | 25 |
| Sandalwood oil, English | 25 |
| Coumarin | 25 |
| Musk ketone | 50 |
| Heliotropin | 50 |
| Hydroxycitronellal | 50 |
| Isobutylphenyl acetate | 50 |
| Rose oil, Bulgarian | 50 |
| Indanylpropanol of Example I | 50 |
| Musk extract 3% | 50 |
| Benzoin R | 50 |
| Benzyl benzoate | 250 |
| Ambergris extract 3% | 250 |

The indanylpropanol is the important amber character donor in the foregoing composition. It lends an amber quality plus sweet and musky fragrance tones and affords a lasting, clinging amber aroma to the other persistent crystalline and resinous ingredients.

What is claimed is:

1. A fragrance composition comprising at least one polyalkylindanylpropanol having the formula

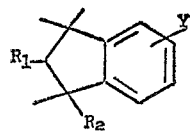

wherein $R_1$ is hydrogen or methyl; $R_2$ is methyl or, when $R_1$ is hydrogen, methyl or ethyl; and Y is 1-hydroxyprop-2-yl; and a perfume oil, the quantity of said polyalkylindanyl-propanol being sufficient to impart the fragrance of said propanol to the oil.

2. A composition according to claim 1 wherein the quantity of polyalkylindanyl propanol is from 2 to 50 percent.

3. A composition according to claim 1 wherein a mixture of the polyalkylindanylpropanols is present.

4. A composition according to claim 3 wherein the mixture contains a major proportion of 2-(1',1',2',3',3'-pentamethylindan-5'-yl)propanol.

References Cited

UNITED STATES PATENTS

| 2,889,367 | 6/1959 | Beets et al. | 252—522 X |
| 3,185,629 | 5/1965 | Beets et al. | 252—522 |
| 3,360,530 | 12/1967 | Heeringa et al. | 252—522 X |

SHEP K. ROSE, Primary Examiner

U.S. Cl. X.R.

260—618 F